United States Patent

[11] 3,599,493

| | | |
|---|---|---|
| [72] | Inventor | Paul Bert Thomas<br>Canton, Mass. |
| [21] | Appl. No. | 852,048 |
| [22] | Filed | Aug. 21, 1969 |
| [45] | Patented | Aug. 17, 1971 |
| [73] | Assignee | Joseph Kaye & Company, Inc.<br>Cambridge, Mass. |

[54] PRESSURE TRANSDUCER APPARATUS
8 Claims, 1 Drawing Fig.

[52] U.S. Cl. ........................................ 73/398 C,
73/411
[51] Int. Cl. ........................................ G01l 9/12
[50] Field of Search .......................... 73/398 C,
411, 413, 414, 415, 416, 417, 418; 317/246;
324/61

[56] References Cited
UNITED STATES PATENTS

| 2,050,629 | 8/1936 | Quereau | 73/411 X |
| 2,867,757 | 1/1959 | Wagner | 317/246 |

Primary Examiner—Donald O. Woodiel
Attorney—Rines and Rines

ABSTRACT: This disclosure deals with pressure transducer apparatus particularly adapted for connection with Bourdon tube sensors, and preferably embodying a variable impedance element coupled with such tube sensors and connected in a bridge-type circuit for producing electrical signals corresponding to the pressure sensed by the sensors.

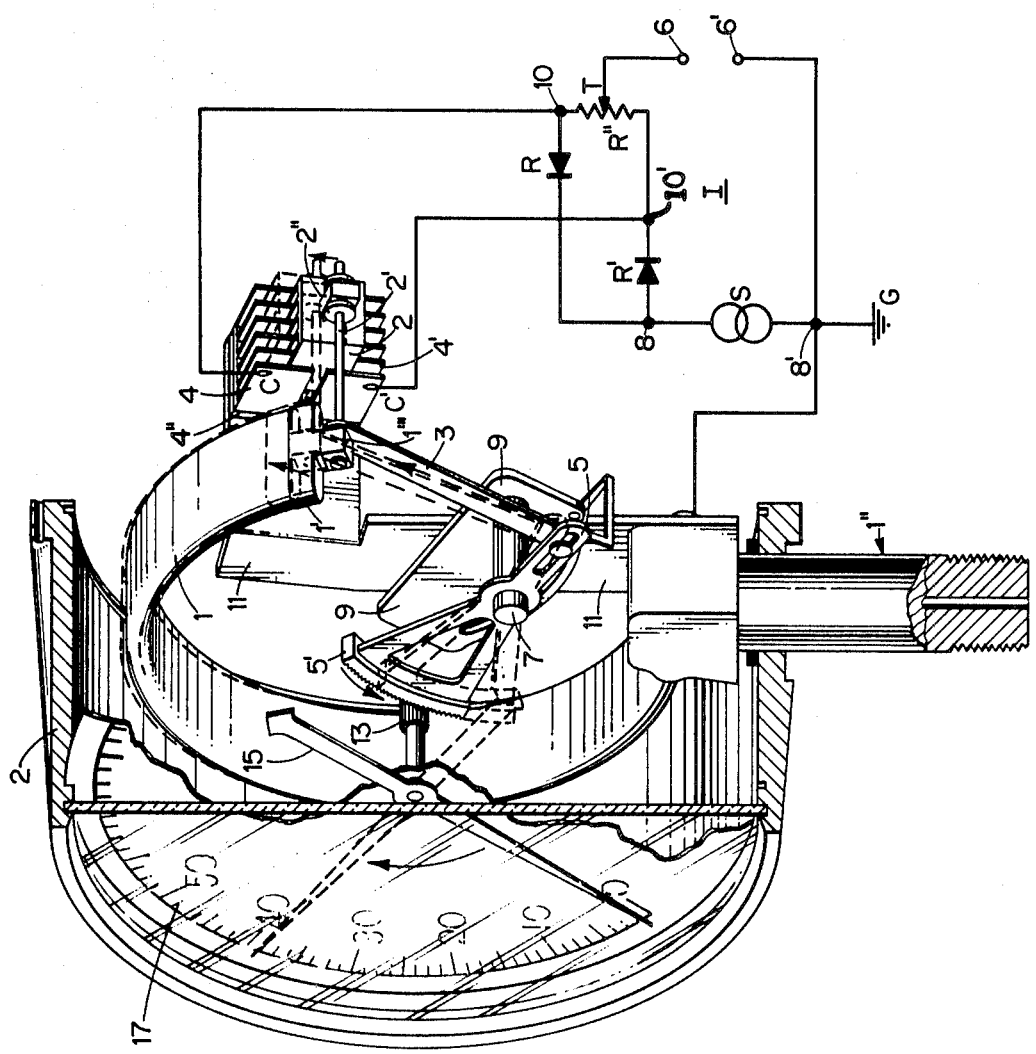
INVENTOR
PAUL B. THOMAS
BY Rines and Rines
ATTORNEYS

PRESSURE TRANSDUCER APPARATUS

The present invention relates to pressure transducer apparatus, being more specifically directed to Bourdon tube, bellows, diaphragm, and similar sensors (hereinafter all generically referred to as Bourdon tubes) and to the development of electric signals corresponding to the pressure being sensed by such sensors.

Numerous types of mechanical motion-to-electric signal transducers suitable for transducing pressure-produced effects have been developed and employed for many years. Among these is the bridge-type variable capacitance transducer described in US. Pat. No. 3,012,192, issued Dec. 5,1961 to K. S. Lion, and in his article entitled "Nonlinear Twin-T Network for Capacitive Transducers" appearing in the Mar. 1964 issue of The Review of Scientific Instruments, Vol. 35, No. 3,p. 353—6.

There are certain applications, however, in which such electrical and electronic transducers and others are to be used in an environment where moving parts are involved that cannot, for satisfactory operation, be loaded by connections to the transducer apparatus; or where such parts are of conducting metals that normally produce electrically interfering effects with electrical bridge or other circuits employed proximal to the transducer apparatus. Included in such applications, for example, are structures involving calibrated and rather sensitive gauge movements, as in Bourdon tube sensors and gauges, the movements of which are to be simultaneously electrically transduced without interfering with their normal operation. These and related problems have therefore made it necessary, where feasible, to involve copious shielding and/or remote and complex coupling structures to enable such operation, at least to some degree of satisfaction.

An object of the present invention, accordingly, is to provide a new and improved transducer apparatus that shall not be subject to the above-described limitations and difficulties and that is particularly suited to such applications as gauge movement and other moving-part structures and the like, without introducing loading, such as friction, interference, or complex and remote coupling structures, and while enabling small and compact apparatus to be employed.

A further object is to provide a new and improved pressure transducer suitable for use with Bourdon tube and related sensors.

Still another object is to provide a novel transducer of more general utility, as well. In summary these ends are attained preferably, though not in all cases essentially, with bridge type circuits of the above-described type and differential-capacitance variable-impedance elements appropriately closely coupled to the Bourdon tube and similar pressure-sensing apparatus.

Other and further objects will be explained hereinafter and are more particularly delineated in the appended claims.

The invention will now be described with reference to the accompanying drawing, the single FIGURE of which is a combined isometric view and schematic circuit diagram of a preferred embodiment, with parts shown broken away to illustrate details of construction.

Referring to the drawing, the invention is shown, for illustrative purposes, as applied to a Bourdon tube type pressure gauge with coupled gauge movement, as of the type described, for example, in the booklet entitled "Ashcroft Pressure and Temperature Instruments," published by Dresser Industries, Inc., 1967, pages 2—11. Such a structure is shown comprising an arcuate or C-shaped flattened Bourdon tube sensor 1, the right-hand tip or terminal portion of which is closed off at 1', and is movable over a small arc in response to pressure changes in the tube effected by connection of the left-hand end to a pressure fluid inlet socket 1'' disposed at the lower portion of the gauge casing 2. The terminal portion 1', as described in said booklet, is connected by a connecting link 3 to a slide-screw arm 5 carrying a toothed segment 5', resiliently pivotally connected at 7 to a slide plate 9, in turn secured to a frame 11, integral with the socket 1'. The teeth of the segment 5' engage a gear 13 axially driving the gauge pointer 15 to indicate upon a calibrated scale 17, the pressure of the fluid passing within the socket inlet 1'' to the Bourdon tube sensor 1.

In accordance with the present invention, simultaneous electrical transducing of the mechanical gauge indication is effected with the aid of a differential variable-capacitance structure having a movable parallel spaced-plate array 2 intermediately interleaved within a pair of similar juxtaposed fixed plate arrays 4 and 4' electrically insulated from each other, and shown mounted at 4'' upon the upper end of, and electrically insulated from, the frame 11. It has been discovered that if the movable pate array 2 is coupled or mounted by a post 2' extending from the common backing 2'' thereof normally to a region 1''' beyond the free end or tip of the terminal portion 1' of the sensor tube 1, the linkage and movement structure associated with the pointer indicator 15 is negligibly loaded and performs its indicating function without any detectable mechanical interference whatsoever. While it might well be expected that mass loading of the tip 1' would have an effect on the operation, this type of post connection to the movable free-floating plates 2 from the region 1''' beyond the free end of the Bourdon tube has proved to provide no such adverse effect. As the terminal portion 1' arcuately moves in response to pressure variations in the tube sensor 1 (as indicated by the dotted line position), the movable plate array 2 will produce differential capacitive variations in the symmetry of the capacitances C and C' (produced between the same and the fixed plate arrays 4 and 4', respectively,) that, preferably in a bridge circuit I of the type described in said patent and article, produces a direct current electrical output at output terminals 6 and 6' that corresponds to the pressure indication on the scale 17 being mechanically indicated by the gauge pointer 15. The use of the airgap capacitance C-C' introduces no friction forces on the gauge linkage. When such a circuit I is used, indeed, it has been further found that the above-described coupling structures, with the airgap capacitance elements 2—4, 2—4' located to the right of the sensor tube 1, prevents any detectable electrical interference with the capacitance and transducing bridge circuit, despite the presence of the conducting, moving metallic parts of the gauge movement.

The preferred circuit I employs the differential capacitances C and C' as arms of a bridge circuit having input terminals 8, 8', the latter of which is grounded at G, and between which an alternating current source S preferably of radio frequency, as later discussed, is connected. The bridge arms comprise a pair of branch circuits, each connected between the input terminals; namely, a first branch containing a rectifier R and the capacitance arm C (between plates 4 and 2, the latter being electrically connected via the Bourdon tube 1 to the grounded frame 11 and thus to the grounded input terminal 8'); and a second branch containing an oppositely poled rectifier R' and the capacitance arm C' (between plates 4' and 2). A series circuit comprising resistance R'' (which may have an adjustable tap T for zeroing adjustments) is connected to both the right-hand rectifier terminals 10 and 10' at which the capacitor plates 4 and 4' are series-connected to the respective rectifiers R and R'. The tap or other intermediate connection T from the resistance circuit R'' is connected to the output terminal 6, it being understood that any desired output device may be connected between output terminals 6 and 6' for responding to the direct current output signal that results at output circuit terminals 6 and 6' from variations in the differential capacitance c-C', as explained in said Lion patent and article.

While it would not appear that the arcuate movement, combined with possible lateral movement of the Bourdon tube terminal portion 1' would enable a substantially linear relationship to be provided with variable capacitance variation over wide limits, it has further been found that the above construction, particularly if both of the stator capacitive arrays 4 and 4' have plates on the outside of both or neither of the outermost plates of the movable array 2, and by adjusting and bending the orientation of the plates to balance any nonlinear properties in the Bourdon tube movement, a most linear relation can be fortuitously obtained and maintained between the pressure sensed by the tube sensor 1 and the corresponding direct current output voltage at 6-6'. By this construction, moreover, the surprising further advantage has been discovered that errors in the gear or mechanical linkage of the gauge movement have no effect upon the integrity and accuracy of the electrical output transduced by the circuit I and this, even though a far less accurate mechanical gauge movement be employed.

As an example, a transducer constructed as above described, operating with a source S of about 40 volts r.m.s. at 1.8 MHz. frequency, a movable capacitive array 2 having five plates about 0.490 inches ×0.525 inches in effective dimensions, stator capacitive arrays 4 and 4' each having six plates about 0.420 inches ×0.525 inches in effective dimension spaced on both sides of the plates 2 about 0.037 inches, and a post length 2' of about 1 inch, produced an output voltage of from 0 to 0.1 volts DC across a load resistance of about 1,000 ohms over a pressure range of from 0 to 100 pounds per square inch with a nonlinearity of from one-tenth to a quarter of a percent of full-scale output. The pressure gauge movement nonlinearity was far greater, being about one-half of a percent of full-scale reading.

While the invention has been described in connection with the preferred circuit I, clearly other types of variable impedance elements and detecting circuits may be employed, though perhaps not with all the advantages set forth in said patent and article.

Further modifications will also occur to those skilled in this art, and all such are considered to fall within the spirit and scope of the invention as defined in the appended claims.

What I claim is:

1. Bourdon tube apparatus having, in combination with a Bourdon tube provided with a terminal portion movable over a small arc in response to pressure changes in the tube, linkage and gauge movement means coupled to the said terminal portion and to an arcuately operated mechanical gauge indicator, a variable-impedance element provided with a movable member, means for directly coupling the said movable member to said terminal portion independently of the coupling to the linkage and gauge movement means, said coupling means being cantilevered from said terminal portion and being devoid of any support between said terminal portion and said movable member, and electric circuit means connected with said variable-impedance element and responsive to the variation thereof effected by said movable member to produce an output electrical signal simultaneously with and corresponding to the indication of said mechanical gauge indication.

2. Apparatus as claimed in claim 1 and in which said variable-impedance element comprises capacitance.

3. Apparatus as claimed in claim 2 and in which said capacitance comprises interleaved fixed and movable plates, the fixed plates being connected to serve with the movable plates as a pair of arms of a balance-detecting bridge, the capacitance differentially varying in said arms in response to movement of the movable plates.

4. Apparatus as claimed in claim 1 and in which said coupling means comprises a post fixed to said terminal portion perpendicular to the plane of arcuate movement thereof.

5. Apparatus as claimed in claim 4 and in which said variable-impedance element comprises capacitance with interleaved fixed and movable plates, the movable plates being attached to said post, and said plates extending substantially parallel to said plane of arcuate movement.

6. Apparatus as claimed in claim 5 and in which said fixed plates comprise two groups spaced apart in overlapping relationship to the movable plates.

7. Bourdon tube apparatus having, in combination with a Bourdon tube provided with a terminal portion movable over a small arc in response to pressure changes in the tube, linkage and gauge movement means coupled to the said terminal portion and to an arcuately operated mechanical gauge indicator, a variable impedance element provided with a movable member, means for coupling the said movable member to said terminal portion independently of the coupling to the linkage and gauge movement means, and electrical circuit means connected with said variable-impedance element and responsive to the variation thereof effected by said movable member to produce an output electrical signal simultaneously with and corresponding to the indication of said mechanical gauge indication, said variable-impedance element comprising capacitance having interleaved fixed and movable plates, the fixed plate being connected to serve with the movable plates as a pair of arms of a balance-detecting bridge of said electric circuit means, the capacitance differentially varying in said arms in response to movement of the movable plates, said bridge being provided with pairs of input and output terminals, one of each of which is grounded, an alternating current voltage source connected between said input terminals, a pair of branch circuits each connected between the input terminals and each comprising a rectifier connected at one terminal thereof in series circuit with one of the variable differential capacitance arms, a further circuit series connecting the said one terminals of the rectifiers together, and a direct current output circuit connected between the further circuit and ground.

8. Apparatus as claimed in claim 7 and in which said further circuit comprises resistance, from an intermediate point of which the output circuit is connected to ground.